(No Model.)
J. H. OSTEN.
TIRE TIGHTENER.
No. 603,733. Patented May 10, 1898.
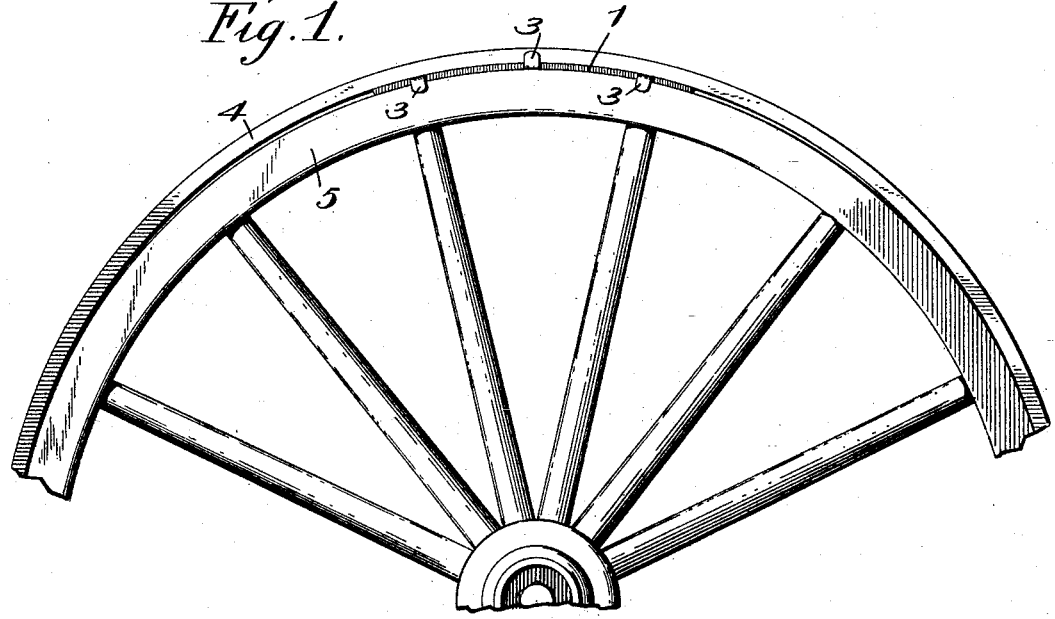
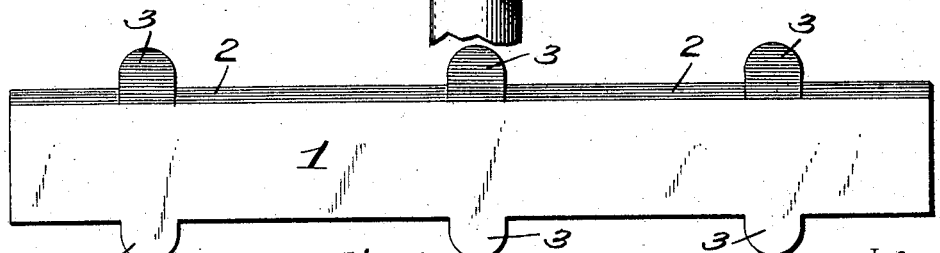
Witnesses
Grant Culverwell.
J. J. Riley
Inventor
James H. Osten.
By his Attorneys,
C. A. Snow & Co.
THE NORRIS PETERS CO., PHOTO-LITHO., WASHINGTON, D. C.

UNITED STATES PATENT OFFICE.

JAMES HENRY OSTEN, OF WHITE CITY, KANSAS.

TIRE-TIGHTENER.

SPECIFICATION forming part of Letters Patent No. 603,733, dated May 10, 1898.

Application filed September 9, 1897. Serial No. 651,087. (No model.)

*To all whom it may concern:*

Be it known that I, JAMES HENRY OSTEN, a citizen of the United States, residing at White City, in the county of Morris and State of Kansas, have invented a new and useful Tire-Tightener, of which the following is a specification.

The invention relates to improvements in tire-tighteners.

The object of the present invention is to improve the construction of tire-tighteners and to provide a simple, inexpensive, and efficient device adapted to be readily applied to a wheel to tighten the tire when the woodwork shrinks in dry weather and capable of ready removal to permit the parts to expand in damp weather, and thereby prevent the wheel from becoming dished.

The invention consists in the construction and novel combination and arrangement of parts, as hereinafter fully described, illustrated in the accompanying drawings, and pointed out in the claim hereto appended.

In the drawings, Figure 1 is a side elevation of a portion of a wheel provided with a tire-tightener constructed in accordance with this invention. Fig. 2 is a transverse sectional view of the same. Fig. 3 is a plan view of the tire-tightener.

Like numerals of reference designate corresponding parts in the several figures of the drawings.

1 designates a tire-tightener consisting of an oblong plate or strip of metal provided at one side with a beveled edge 2 and adapted to be interposed between a felly and a tire to tighten a wheel and to extend longitudinally of the tire for a considerable distance, as clearly illustrated in Figs. 1 and 2 of the accompanying drawings. The beveled edge forms a wedge-shaped side portion and enables the device to be readily driven between the tire and the felly without becoming embedded in the felly and checked, and the wedge-shaped portion also insures the necessary expanding action of the device.

The strip or plate may be of any length and thickness, and it is provided at intervals with integral lips 3, substantially segmental, as shown, and adapted, after the device is driven between the tire 4 and felly 5, to be bent against the sides of the latter, whereby the device is retained in position. The lips on the side adjacent to the beveled edge are correspondingly beveled to enable them to be readily driven between the tire and felly without liability of becoming broken or otherwise injured.

The invention has the following advantages: The device is simple, inexpensive, strong, and durable and is adapted to be readily driven between a tire and a felly, and it may be readily arranged at different points around the periphery of the wheel to secure the desired degree of tightness. The lips, which engage the felly, hold the device in position and are adapted to be readily bent out of engagement with the felly to permit the device to be removed in order to avoid dishing the wheel in damp weather, when the woodwork expands. The lips also strengthen the felly and afford a support for the same should the felly become cracked or otherwise weakened. The device is also adapted to hold a felly in position should the same become buckled, as the lips may be bent in opposite directions and engaged with both the felly and the tire.

What I claim is—

A device of the class described designed to be applied to a wheel after the same has become worn and adapted to tighten the tire, and comprising a strip of metal designed to be driven between the tire and the felly and adapted to extend longitudinally of the same and provided at one side with a longitudinally-disposed beveled edge 2, forming a wedge-shaped portion to enable the device to be readily forced into position, and the lips 3 arranged at intervals throughout the length of the strip at each of its side edges and adapted to be bent in opposite directions to engage the opposite faces of the wheel, the lips at the beveled edge of the strip being beveled or wedge-shaped, substantially as described.

In testimony that I claim the foregoing as my own I have hereto affixed my signature in the presence of two witnesses.

JAMES HENRY OSTEN.

Witnesses:
W. J. MCMULLIN,
J. P. ZIMMERMAN.